Aug. 22, 1961  J. A. FAYCOSH  2,996,824
FISHING ROD HOLDER
Filed June 26, 1959  2 Sheets-Sheet 1
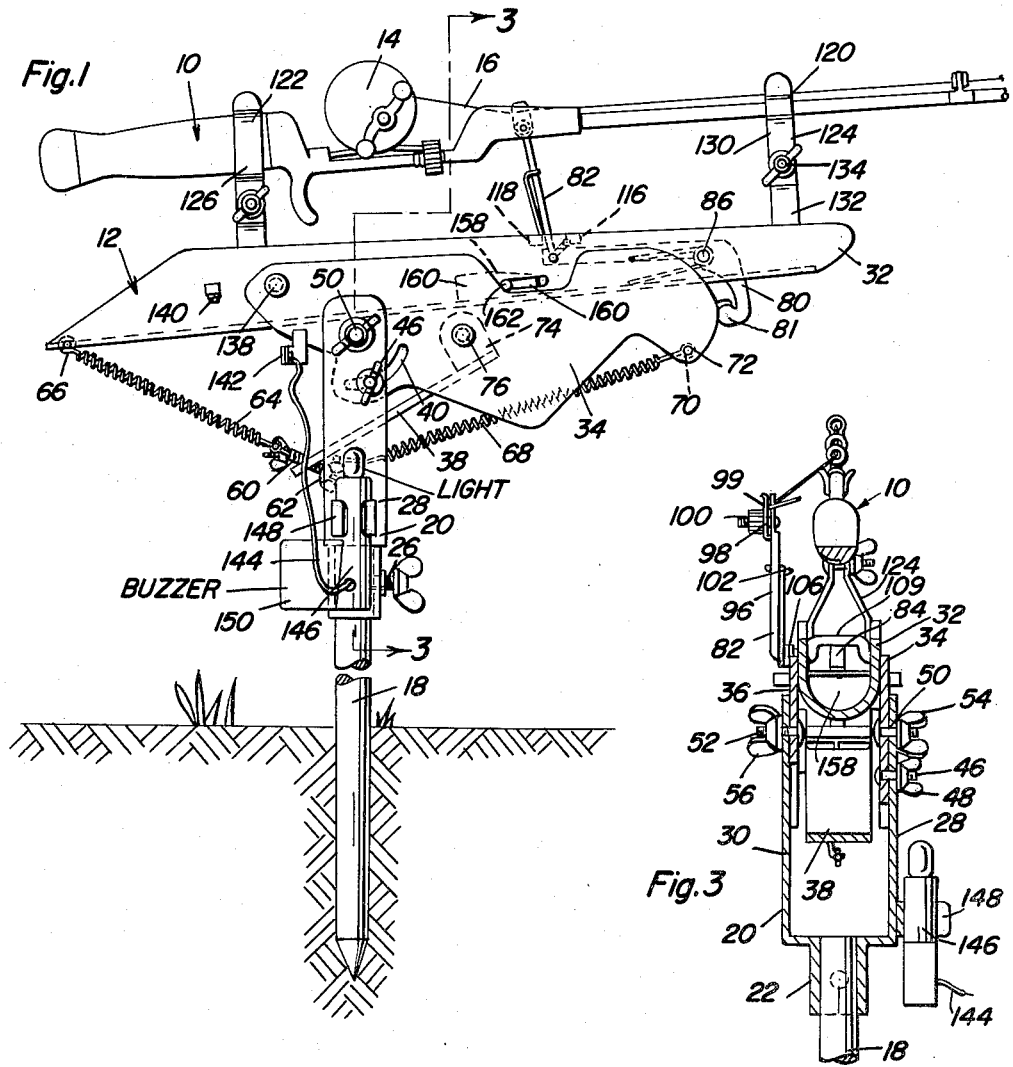
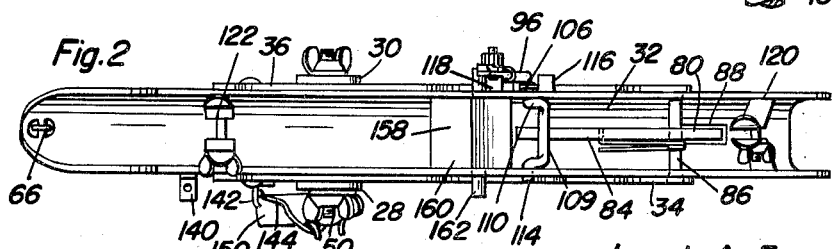
Joseph A. Faycosh
INVENTOR.

Aug. 22, 1961 J. A. FAYCOSH 2,996,824
FISHING ROD HOLDER
Filed June 26, 1959 2 Sheets-Sheet 2
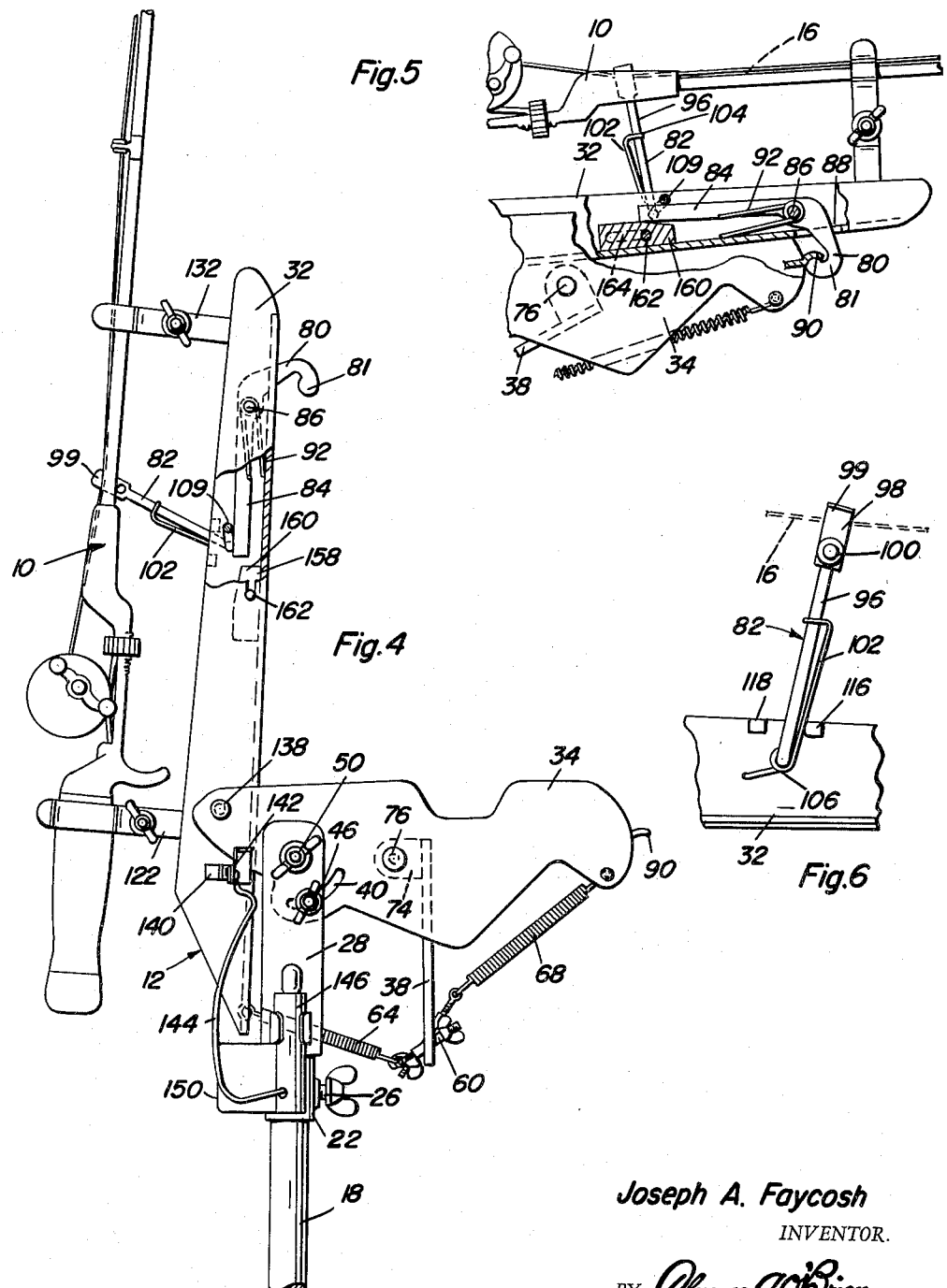
Joseph A. Faycosh
INVENTOR.

United States Patent Office 2,996,824
Patented Aug. 22, 1961

2,996,824
FISHING ROD HOLDER
Joseph A. Faycosh, P.O. Box 9, Frederick, Colo., assignor of fifty percent to Miles O. Ward, Lyons, Colo.
Filed June 26, 1959, Ser. No. 823,192
7 Claims. (Cl. 43—16)

This invention relates to fishing appliances and more particularly to a fishing rod or a line holder.

The holder may be constructed in different sizes for different types of fishing. For example, a larger and generally heavier construction is required for surf fishing, and a smaller, lighter construction may be used for fresh water and still fishing or fishing through an opening in ice.

An object of the invention is to provide an appliance for fishermen, the appliance being adapted to support a fishing rod or line without a rod, in such a manner that it is retained operatively in position for fishing during which time the fisherman may leave the rod or line unattended and perform other duties or rest.

When a fish strikes the bait at the end of the line, means are triggered for releasing an arm that is held under spring load so that the arm is quickly jerked in a direction which causes the fishhook to engage the fish, holding the fish firmly secured on the hook.

A further object of the invention is to provide a holder for a fishing rod or line, depending on the desires of the user, and hold the rod or line in such a way that as soon as a jerk is received on the line, for instance by a fish biting, a trigger is released causing the holder arm to quickly pull the line so as to hook the fish. Thereafter a signal is given, for instance a flashlight type of circuit may be caused to close to furnish a visual signal or to energize a buzzer or bell and thereby cause an audible signal.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the appliance showing it used with a fishing rod.

FIGURE 2 is a top view of the appliance with the fishing rod removed.

FIGURE 3 is a sectional view taken approximately on the line 3—3 of FIGURE 1.

FIGURE 4 is a side elevational view similar to FIGURE 1 but showing the fishing appliance as it would appear after a fish has been struck.

FIGURE 5 is a fragmentary elevational view, parts broken away in section to illustrate details of the trigger mechanism and lock used therewith.

FIGURE 6 is a fragmentary side elevational view of a portion of the trigger operating mechanism.

In the conventional drawings a conventional fishing rod 10 is shown connected with fishing appliance 12. It is to be noted at the outset that the fishing rod is equipped with a reel 14 and a fishing line 16. The reel can, of course, be omitted and in fact, the entire rod may be omitted and line 16 used by itself in appliance 12. Rod 10, when used with appliance 12, would provide the customary environment for appliance 12, and this would include both still fishing and trolling.

Appliance 12 has a peg 18 inserted in the ground, although the peg may be substituted by some other type of base or clamp. In either type of construction there is a fork 20 equipped with a socket 22 at its lower end (FIGURE 3) and within which the upper end of the peg 18 is fitted. A setscrew 26 or a like fastener is carried by socket 22 and engages the upper part of peg 18 that occupies socket 22. Fork 20 has sides 28 and 30 between which there are arm 32, a pair of adjustable support plates 34 and 36 and an operating lever 38. Adjustable support plates 34 and 36 each has slots 40 or only one of the support plates, for instance plate 34 has a slot 40 receiving bolt 46 on which there is a wing nut 48. The bolt extends through an aperture in fork side 28. Both support plates have apertures accommodating pivot bolts 50 and 52 on which wing nuts 54 and 56 are threaded. Bolts 50 and 52 extend through aligned openings in the sides 28 and 30 and also in the plates 34 and 36. The longitudinal axes of bolts 50 and 52 are aligned to establish a pivot axis for both of the support plates 34 and 36 which are adjustable in unison. When adjusted to the selected rotational position to establish an axis of alignment for arm 32, the wing nut 48 is tightened, holding the adjustment of the plates.

The operating lever 38 has an aperture at its lower end through which a short rod 60 extends. The rod is threaded and has a wing nut 62 at one end. The opposite end has a spring 64 attached thereto, for instance by an eye, and the opposite end 66 of spring 64 is attached to one end of arm 32. A similar connection between spring 68 and lever 38 attaches the inner end of spring 68 to lever 38, and the opposite end 70 of spring 68 is attached to a transverse pin 72 secured to the plates 34 and 36. The upper end of operating lever 38 has a pair of ears 74 fixed thereto and through which a pivot bolt or pin 76 passes. This pivot pin is secured to both plates 34 and 36 thereby pivotally mounting operating lever 38 between the plates 34 and 36. It is pointed out that lever 38 is capable of pivotal movement; spring 68 is secured to plates 34 and 36 and also to the lower end of lever 38; and spring 64 is secured to the lower end of lever 38 and to one end of arm 32.

The arm 32 is of special construction. It is U-shaped in cross-section to facilitate manufacture and to support a trigger 80 between the sides thereof and to support the lower end of the trigger operating mechanism 82. Trigger 80 (FIGURE 5) has a hook 81 at one end and an arm 84 at the other end. A pivot 86 passes through an opening in the trigger between hook 81 and arm 84 and mounts the trigger for pivotal movement between the sides of U-shaped arm 32. The hook portion of the trigger extends through an opening 88 in the bottom of the arm 32 to enable the hook 81 to engage a stop 90 attached to the forward ends of plates 34 and 36. The trigger retains the arm 32 in a down position against the force of biasing springs 64 and 68. A light trigger spring 92 is coiled around pivot 86 and has the ends thereof in engagement with the lower surface of arm 84 and the upper surface of the bottom of the U-shaped arm 32. Spring 92 is a return spring and serves to keep the trigger in a depressed condition so that it will automatically engage stop 90 when the arm 32 is swung down from the position shown in FIGURE 4 to the position shown in FIGURE 1.

The trigger operating mechanism 82 consists of an upstanding arm 96 equipped with a fishing line clamp 98 at its upper end. The fishing line clamp may consists merely of a clamp plate 99 held flush against a surface of arm 96 by means of a screw and nut 100 which passes through aligned openings in clamp plate 99 and the upper part of arm 96. A slight spring 102 (FIG. 6) has a hook 104 at one end engaged around the shank of arm 82 and has an intermediate part 106 coiled around an offset 110 (FIGURE 2) at the lower part of arm 96. This offset extends through an opening in the side of arm 32 and has a trigger depressing crank 109 joined thereto and made integral therewith. The crank bears on the top surface of trigger arm 84 and terminates in a spindle or journal 114 which is extended through a bearing opening in the opposite side of arm 32. Two stops 116 and 118 (FIG. 6) which are fixed to one side of the arm 32 establish the limits for the swinging movement of arm 82. Fishing line 16 is secured to arm 96 by means of clamp 98.

There are two saddles 120 and 122 attached to the arm 32 at the forward and rearward parts thereof. These saddles constitute parts of rod clamps 124 and 126 which are preferably made adjustable by means of clamp plates 130 held on upstanding arms 132 which are secured at their lower ends to arm 32. The clamp plates may be tightened by means of screw and nut assemblies 134 in order to clamp onto the rod 10 at spaced places thereof.

The arm 32 is mounted for pivotal movement on a pivot pin 138 which extends through aligned openings in plates 34 and 36 whereby the pivotal movement of arm 32 is with respect to the plates 34 and 36. Further, there is a contact 140 attached to arm 32 on one side thereof and engageable with contact 142 attached by means of insulation material to the plate 34. When the arm 32 swings to the upper position (FIGURE 4) contact 140 which is a ground contact, engages contact 142 which is connected by conductor 144 to a flashlight 146. The flashlight is attached by means of a spring clip 148 to fork 20 and provides a source of signal illumination when the flashlight circuit is closed. The flashlight circuit is conventional and is not shown in detail. To use the flashlight circuit as shown in the drawings, the socket for the lamp in the flashlight is connected by the spring clip 148 and the flashlight casing to ground, namely the fork 20, side plates 34 and 36, and arm 32. The lowermost battery in the flashlight is separated from the flashlight casing or the spring at the end tap of the flashlight, if there is one furnished in the flashlight, by means of an insulating disk. Conductor 144, then, need only be connected to the lowermost battery that is, touching the bottom of the metal container or casing thereof, and connected to the contact 142. When the contacts 140 and 142 engage, the flashlight circuit is thereby closed, causing the electric light of the flashlight to be energized. This furnishes a visual signal. An audible signal may be supplied by means of a buzzer 150, bell or the like which is connected in parallel with the described flashlight circuit. Consequently, a switch may be applied in the parallel connection so as to furnish the user with an option of either the audible or visual signal or both.

In use and operation the appliance is installed on a boat or on shore or any other place suitable for installation. The block 158 which consists of a sliding block 160 between the sides of arm 32, is released. This block has a pin 162 projecting laterally therefrom and passed through a slot 164 in one side of arm 32. The shape of the block is such that when it is slid forward, the leading edge of the block slips underneath arm 84 of trigger 80 preventing it from operating. Consequently, the latch may be released by simply sliding the block 160 (FIGURE 5) rearwardly.

Arm 32 together with a fishing rod are swung downward and the trigger 80 automatically engages the stop 90. As the arm is swung to a down position both springs 64 and 68 are stretched and due to the spring effect on lever 38, it is deflected to the approximate position shown in FIGURE 1. Line 16 is connected in line clamp 98 of the trigger operating mechanism 82.

As soon as a jerk is applied onto the line, and the force of the jerk necessary to operate the mechanism may be governed by the tension of spring 102, operating mechanism arm 96 is pulled forward thereby depressing arm 84 of the trigger 80. This causes the trigger to oscillate pivotally about pin 86 and the hook 81 become released from stop 90. At this instant the forces derived from the spring tension of both springs 64 and 68 quickly and rapidly deflect the lever 38 causing the arm 32 to be pulled from the spring connection end 66. Consequently, the forward end of arm 32 is promptly elevated and this jerks the line to hook the fish. The switch formed by contacts 140 and 142 becomes closed and provides the audible and/or visual signal which has been described previously.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A fishing appliance comprising the combination of an arm, means for supporting said arm for pivotal movement about an axis between the forward and rearward ends of said arm, said supporting means including at least one plate, a trigger carried by said arm, a trigger stop attached to said plate and when engaged by said trigger said trigger and trigger stop holding said arm in a rest position, resilient means connected with said arm and said arm supporting means for pivotally actuating said arm in response to release of said trigger, trigger operating means connected with said arm, said trigger operating means including a trigger operating arm pivoted on said arm and having a portion in engagement with said trigger, and means connected with said trigger operating arm for attaching a fish line thereto so that upon a jerk applied to the fish line said trigger operated arm is deflected and thereby operates said trigger, said resilient means including at least one spring attached at one end to said plate, a depending lever pivotally attached to said plate, said spring being attached at its other end to said lever near one end of the lever, and an additional spring connected with said lever and the rearward end of said arm.

2. A fishing appliance comprising the combination of an arm, means for mounting said arm for pivotal movement about an axis between the forward and rearward ends of said arm, said mounting means including at least one plate, a trigger carried by said arm, a trigger stop attached to said plate and when engaged by said trigger said trigger and trigger stop holding said arm in a rest position, resilient means connected with said arm and said arm mounting means for pivotally actuating said arm in response to release of said trigger, trigger operating means connected with said arm, said trigger operating means including a trigger operating arm pivoted on said arm and having a portion in engagement with said trigger, and means connected with said trigger operating arm for attaching a fish line thereto so that upon a jerk applied to the fish line said trigger operated arm is deflected and thereby operates said trigger, said resilient means including at least one spring attached at one end to said plate, a lever pivotally attached to said plate, said spring being attached at its other end to said lever near one end thereof, and an additional spring connected at one end with said lever and at the other end with the rearward end of said arm.

3. The appliance of claim 2 wherein said means mounting said arm for pivotal movement includes a fork to which said plate is adjustably secured to adjust the intended best operating position of said plate, and an electrical signal device which is rendered operative when said arm is tripped and actuated to a line jerking position and which is carried by said fork.

4. The appliance of claim 3 wherein said electrical signal device includes a flashlight circuit having a switch therein, one contact element of said switch carried by said plate and another contact element carried by said arm.

5. A bite actuated fish hook setting rod and line holder and fishing appliance comprising, in combination, support means embodying an upstanding yoke and means for securing the yoke to a fixed support, the ground for example, a pair of horizontally elongated spaced parallel plates removably and adjustably mounted between the arms of said fork, a horizontally elongated fishing rod and line holding arm having a major portion thereof normally located in a cocked position between the plates and having a median portion pivoted to the plates and an end portion projecting beyond the plates, said end portion being trippable in a manner to cause the arm to swing from a horizontal cocked position to a fishing line jerking and hook-setting position, a lever having an upper end portion pivoted between the plates and a lower end portion extending through the space between the fork arms when the arm is in cocked position, a first coil spring connected at one end to a lower end of said lever and at the other end to one of said plates, a second coil spring connected to a lower end of said lever and connected at its opposite end to said arm for biasing the arm from a cocked to a line jerking position, signal means mounted on one of the fork arms, a movable contact element carried by the actuatable end portion of said arm, a second contact element for engagement by said movable contact element carried by an adjacent one of the plates, an operating connection between the signal and contact elements, at least one of said plates being provided at a forward end portion with a projecting trigger retaining stop, trigger means mounted on said arm and having a hook releasably engageable with said trigger stop, and trigger releasing line tripped means carried by said arm.

6. The structure defined in claim 5, and wherein said trigger embodies an arm pivotally mounted on said first-named arm and having a depending portion with a hook engaging the trigger stop, said pivoted arm being spring-biased, and said last-named means comprising an arm pivotally mounted on said first-named arm and having a trigger tripping crank operatively associated and engageable with said trigger arm and having spring-actuating means and also an adjustable line clamping clip.

7. The structure defined in claim 5, and wherein said trigger embodies an arm pivotally mounted on said first-named arm and having a depending portion with a hook engaging the trigger stop, said pivoted arm being spring-biased, and said last-named means comprising an arm pivotally mounted on said first-named arm and having a trigger tripping crank operatively associated and engageable with said trigger arm and having spring-actuating means and also an adjustable line clamping clip, and in combination, a block slidable on said arm, said block constituting a manually releasable safety latch and being interposed between the arm on which it is mounted and the trigger arm but movable to an out-of-the-way position to allow the trigger arm to function whenever necessary or desired.

References Cited in the file of this patent

UNITED STATES PATENTS

| | | |
|---|---|---|
| 2,590,721 | Muth | Mar. 25, 1952 |
| 2,744,351 | Smith | May 8, 1956 |
| 2,811,801 | Daniel | Nov. 5, 1957 |
| 2,909,860 | Braun | Oct. 27, 1959 |
| 2,944,361 | Coulter | July 12, 1960 |